April 24, 1956
S. APOSTOLESCU
2,742,972
TURBO JET HELICOPTER
Filed May 17, 1952
2 Sheets-Sheet 1
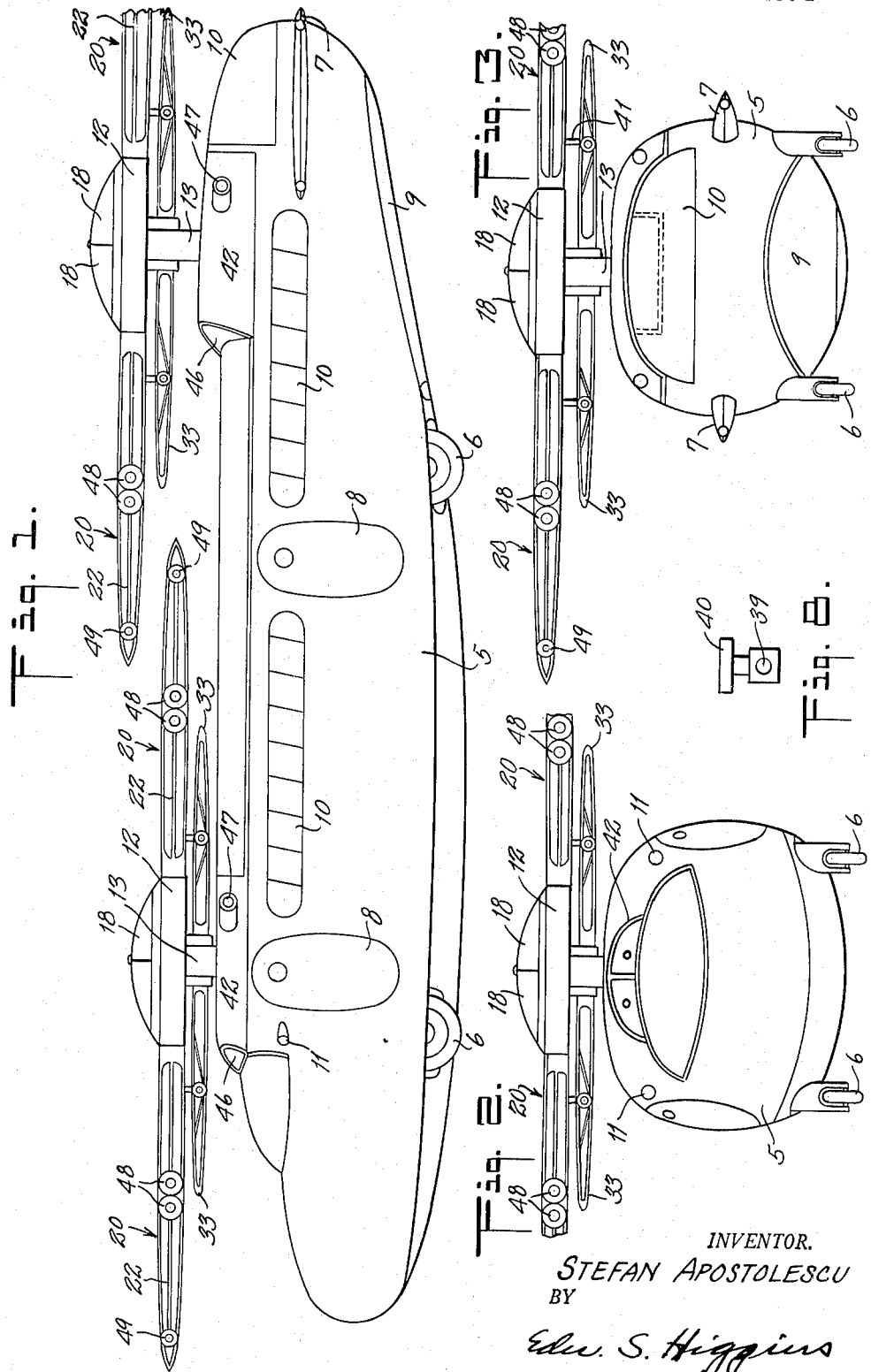
INVENTOR.
STEFAN APOSTOLESCU
BY
Edw. S. Higgins
ATTORNEY

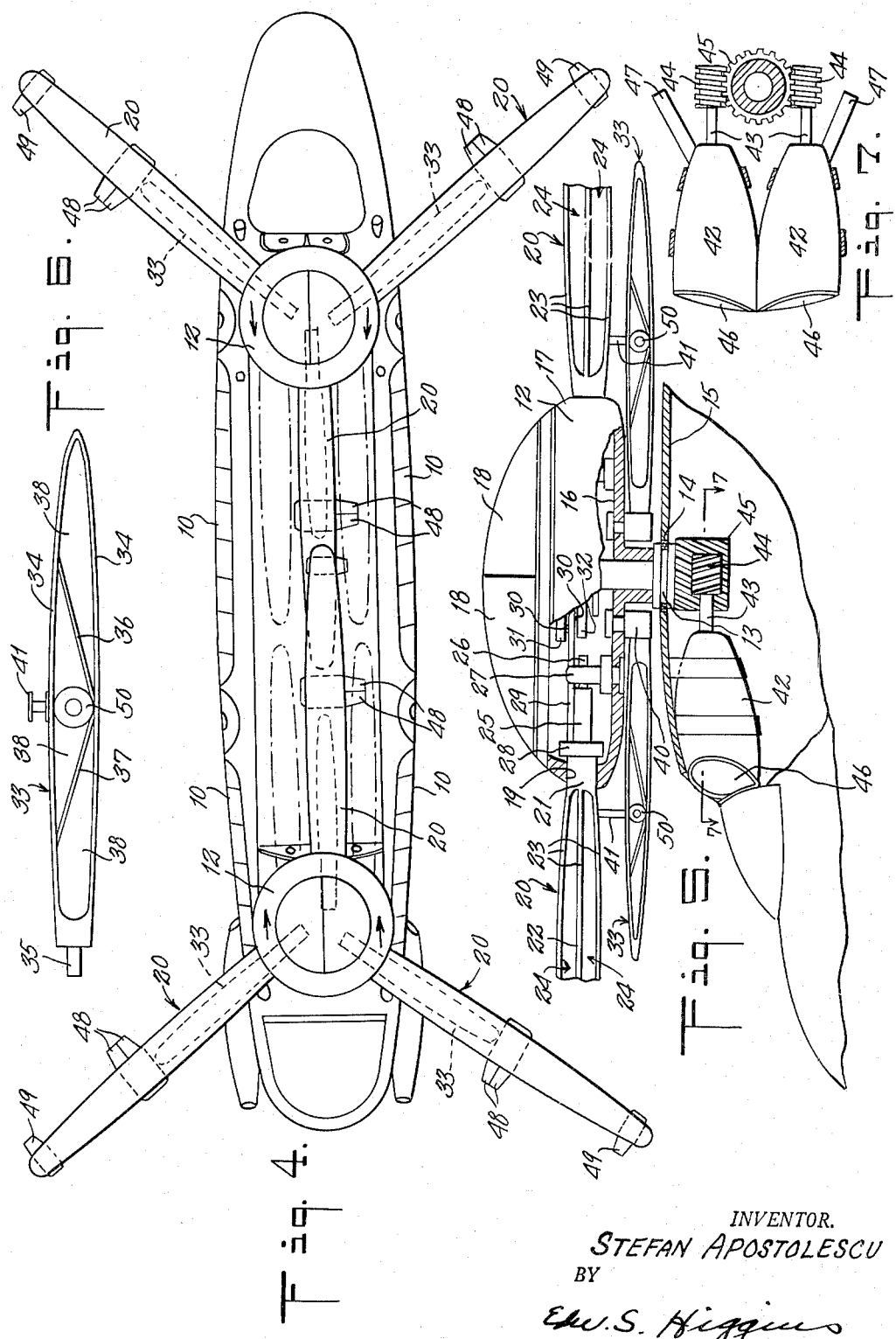

United States Patent Office 2,742,972
Patented Apr. 24, 1956

2,742,972

TURBO JET HELICOPTER

Stefan Apostolescu, New York, N. Y.

Application May 17, 1952, Serial No. 288,459

3 Claims. (Cl. 170—135.7)

This invention relates to helicopters and more particularly to jet propelled helicopters.

A primary object of the present invention is to provide a helicopter with rotor constructions driven by turbo jet engines.

Another object of the invention is to provide a helicopter of this kind with ram jet engines in the blades.

A further object of the invention is to provide a helicopter rotor having upper and lower blades, said blades supporting jet engines for propelling the helicopter.

Yet another object of the invention is to provide a helicopter rotor having upper and lower blades arranged in pairs, the blades of a pair being connected together for movement as a unit.

A still further object of the invention is to provide a helicopter of this kind that eliminates unnecessary shafting and gearing.

Another object of the invention is to increase the stability, the speed, the lifting power and the over-all efficiency of multi-rotor helicopters.

Other objects and advantages of the improved helicopter will be apparent from the description of the invention to follow taken in connection with the accompanying drawings in which—

Fig. 1 is a side elevational view of a helicopter embodying my invention.

Fig. 2 is a front view thereof.

Fig. 3 is a rear view thereof.

Fig. 4 is a top plan view thereof.

Fig. 5 is a fragmentary sectional view showing the operative connection between a turbo jet engine and the rotor shaft and the mounting of the upper and lower blades.

Fig. 6 is a side elevational view of a lower blade.

Fig. 7 is a sectional view taken on the plane of the line 7—7 of Fig. 5 and looking in the direction of the arrows.

Fig. 8 is a detail view showing the socket bearing for the shank of the lower blade.

Referring to the drawings in detail, the improved helicopter comprises a fuselage body 5 provided with landing gear wheels 6 at its sides and with conventional airfoils 7 for steering at its rear. The fuselage body is streamlined and may be of any design suitable for travel in the air, on land and on water. The fuselage body is also provided with side doors 8 and a lower rear door 9 for providing access to the interior of the fuselage body for any desired purpose. Elongated windows 10 are also formed in the side walls of the fuselage body together with lamps 11.

The helicopter is driven by rotor units positioned at the front and at the rear of the fuselage body. Each rotor construction comprises a hollow drum 12 provided with a central tubular shaft 13 depending from the drum body and extending through an opening 14 in the top wall 15 of the fuselage body therebeneath into the interior of the fuselage body as shown in Fig. 5. The drum body has a bottom wall 16 and a curved side wall 17. The top of the drum is closed by a dome-shaped cover consisting of two cover sections 18, 18 hinged to the top of the side wall. The side wall of the drum is provided with a series of circumferentially spaced openings 19, each drum having three of such openings.

A plurality of upper rotor blades 20 are radially supported around each drum, one blade for each opening 19. Each of the upper blades consists of an elongated hollow paddle shaped body open at its sides with a solid cylindrical shank portion 21 at one end. The hollow body has a central partition 22 forming the body of the blade with three planes or airfoils 23, 23, 23, with air passages 24, 24 therebetween. The shank portion is formed with a cylindrical extension 25 which is smaller than the shank portion in diameter, and the extension 25 terminates in an extension 26 which is smaller in diameter than the diameter of the extension 25.

Rotatably secured in the bottom wall 16 of the drum in line with each opening 19 is an upright standard or bracket 27 having a bearing opening adjacent its upper end for tiltably receiving the extension 26 of the shank portion of the adjacent blade 20. The extension 26 may be fastened to the bracket by a pin or any other suitable means.

On the shank portion of each upper blade is mounted a collar 28 and an arm 29 extending integrally from a point on the outer periphery thereof. The outer end of the arm 29 supports ball bearings 30 in the upper and lower surfaces thereof, and extends between an upper disc member 31 and a lower disc member 32, with the ball bearings in engagement therewith, the latter disc member being provided with a camming device on its upper surface whereby the angle of incidence of the blade is changed. These discs and the mechanism for actuating the camming device are more clearly described in my copending application Serial Number 219,035 filed April 3, 1951.

A lower blade 33 is supported by the drum 12 below and in alignment with each upper blade 20. Each auxiliary blade 33 comprises an elongated hollow paddle-shaped body open at its sides to provide two planes or airfoils 34, 34, and has a solid cylindrical shank portion 35 at one end. A strut member 36 extending downwardly and forwardly connecting and bracing the two airfoils is provided, and a similar strut 37 extends upwardly and forwardly for the same purpose. These struts divide the hollow body into air passages 38. The shank portion 35 of the blade extends through and is tiltably supported by a socket bearing 39 in a bracket member 40 which is rotatably mounted in the bottom wall 16 of the drum 12 and depends downwardly therefrom. Each lower blade 33 is operatively connected to its companion upper blade 20 by a connecting member 41 so that said companion upper and lower blades form a unit whereby movement of one blade is imparted to the other. It will be seen that there are three pairs of upper and lower blades making six blades in all. The shaft 13 of the rotor construction at the rear is longer than the shaft 13 of the front rotor construction so that the blades of said rear rotor construction are raised above the blades of the front rotor construction so that they are free of any turbulent air stirred up by the front rotor blades.

The rotor constructions are driven by pairs of turbo jet engines 42, 42 which are arranged in tandem with a pair of engines at each side of each drum 12. An engine of each pair is disposed at one side of the rotor shaft 13, with its turbo shaft 43 operatively connected to the rotor shaft by a screw 44 on the outer end of the turbo shaft meshing with a gear 45 fastened to the lower end of the rotor shaft. Each turbo jet engine has an air inlet 46 at one end and an exhaust 47 at its other end.

Mounted in the hollow body of each upper blade 20, midway its ends, is a pair of ram jet engines 48, 48, and mounted adjacent the outer tip of each such upper blade is another ram jet engine 49.

In the hollow body of each lower blade 33, midway its ends, between the struts 36 and 37, is mounted a ram jet engine 50.

It will be understood that the turbo jet engines 42 which are connected to the rotor shafts 13 are sufficient to drive the rotor constructions, but should such engines get out of order the ram jet engines carried by the blades will turn the rotors and drive the helicopter and vice versa, so that there is always a margin of safety present not provided for in the prior art helicopters.

It will also be understood that the ram jet engines carried by the blades will prevent the blades from becoming iced during freezing weather.

It will be understood that the jet engines may be fueled and controlled in any suitable manner such as disclosed in Patent 2,472,917.

By the use and arrangement of upper and lower wings and jet engines as disclosed, I have eliminated the shafting, gearing and the like of the prior art structures and have increased the stability, speed, lifting power and over-all efficiency of the helicopter.

Changes in details of construction might be made without departing from the spirit of the inveniton.

I claim:

1. In a helicopter, a fuselage body having an opening in its top, a shaft rotatably supported in said body and projecting outwardly through said opening, a pair of turbo jet engines supported by said fuselage body, drive shafts projecting from said engines, worms on the ends of said engine shafts, a worm gear on the end of said rotatable shaft in continuous engagement with said worms, a drum secured to the outer end of said rotatable shaft, spaced pairs of upper and lower blades tiltably carried by said drum, means supported by said drum for tilting the upper blades of each pair of blades, and means of connection between the upper blade and the lower blade of each pair of blades whereby said blades tilt in unison.

2. In a helicopter, a fuselage body having an opening in its top, a shaft rotatably supported in said fuselage body and projecting outwardly through said opening, a pair of turbo jet engines supported by said fuselage body, drive shafts projecting from said engines, worms on the ends of said engine shafts, a worm gear on the end of said rotatable shaft in continuous mesh with said worms, a drum secured to the outer end of said rotatable shaft, said drum having spaced side openings, pairs of socketed bearing members on said drum, one socketed bearing member of each pair extending upwardly from the drum in line with one of the side openings in the drum, the other socketed bearing member of the pair depending from the drum, spaced pairs of upper and lower blades supported on said drum, said upper blades each having one end extending through a side opening in the drum and being rotatably connected to the upstanding bearing member in line therewith, said lower blades each having one end rotatably conneced to an adjacent downwardly extending bearing member, means mounted in said drum for tilting said upper blades, and means of connection between the upper blades and lower blades whereby said blades are tilted in unison.

3. In a helicopter, a fuselage body having an opening in its top, a shaft rotatably supported in said fuselage body and projecting outwardly through said opening, a pair of turbo jet engines supported by said fuselage body, drive shafts projecting from said engines, worms on the ends of said engine shafts, a worm gear on the end of said rotatable shaft in continuous mesh with said worms, a drum secured to the outer end of said rotatable shaft, said drum having spaced side openings, pairs of socketed bearing members on said drum, one socketed bearing member of each pair extending upwardly from the drum in line with one of the side openings in the drum, the other socketed bearing member of the pair depending from the drum, spaced pairs of upper and lower blades supported on said drum, said upper blades each having one end extending through a side opening in the drum and being rotatably connected to the upstanding bearing member in line therewith, said lower blades each having one end rotatably connected to an adjacent downwardly extending bearing member, means mounted in the drum for tilting said upper blades, means of connection between the upper blades and lower blades whereby said blades are tilted in unison, and ram jet engines supported by the blades for rotating the blades independently of the turbo jet engines.

References Cited in the file of this patent

UNITED STATES PATENTS

| | | |
|---|---|---|
| 1,813,877 | Gunn | July 7, 1931 |
| 1,869,867 | Rosenberg | Aug. 2, 1932 |
| 2,273,303 | Waldron | Feb. 17, 1942 |
| 2,344,266 | Reissner | Mar. 14, 1944 |
| 2,488,018 | Marriage | Nov. 15, 1949 |

FOREIGN PATENTS

| | | |
|---|---|---|
| 3,379 | Great Britain | of 1913 |
| 614,696 | Great Britain | Dec. 20, 1948 |
| 625,176 | Great Britain | June 23, 1949 |
| 636,653 | Great Britain | May 3, 1950 |
| 915,917 | France | Aug. 5, 1946 |